May 13, 1969  H. B. KAUFMAN, JR  3,443,505
COOLING APPARATUS FOR BAKERY PRODUCTS
Filed Sept. 26, 1967

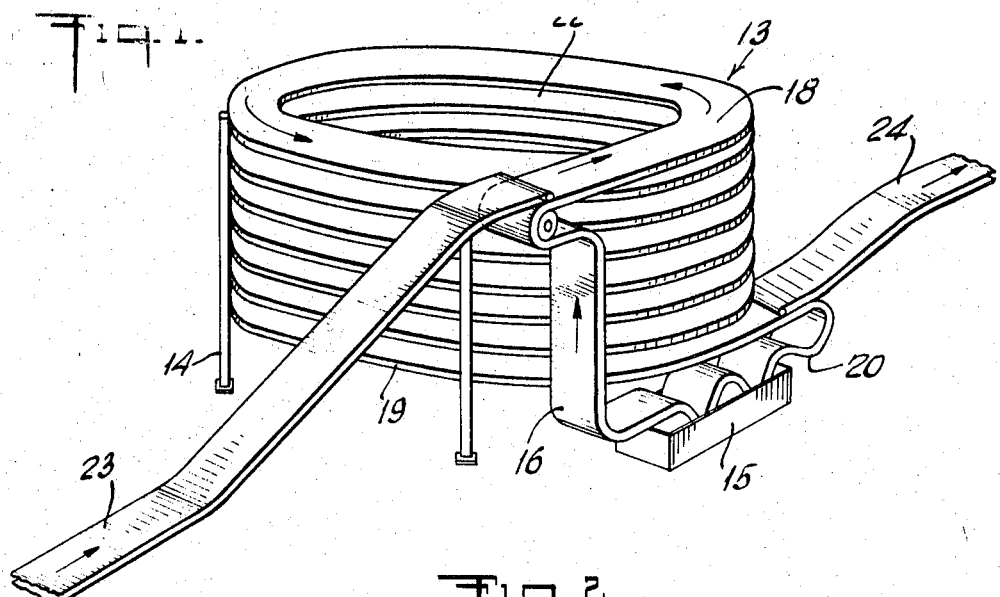
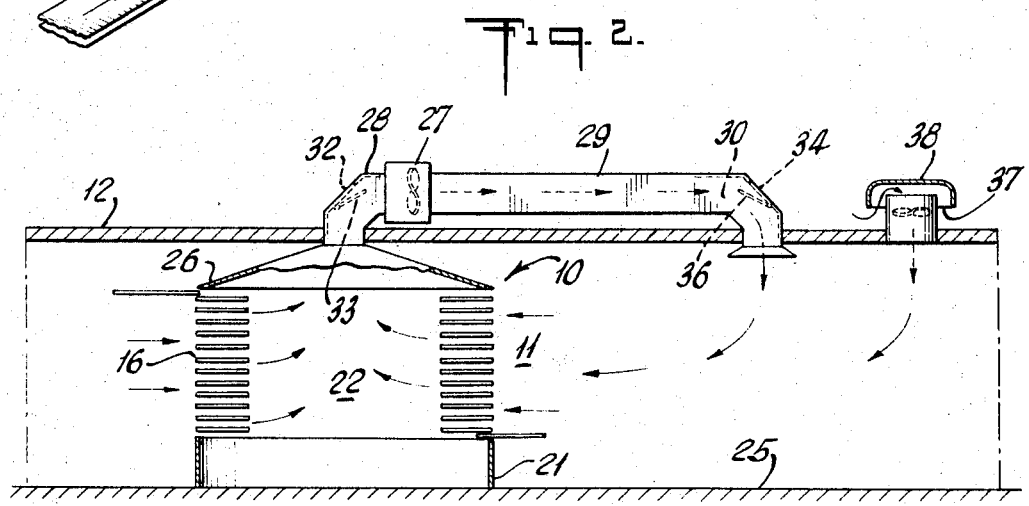
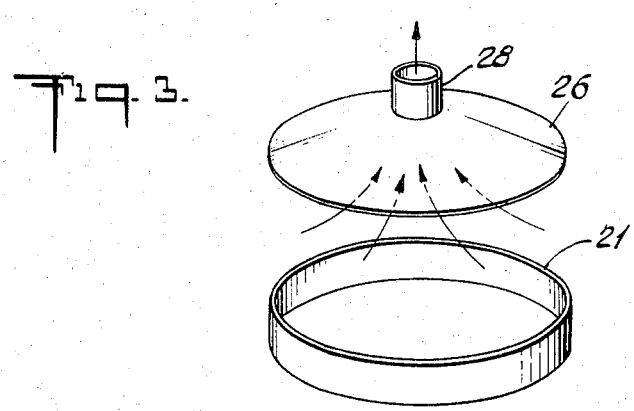

INVENTOR
HAROLD B. KAUFMAN, JR.
BY
ATTORNEY

United States Patent Office 3,443,505
Patented May 13, 1969

1

3,443,505
COOLING APPARATUS FOR BAKERY PRODUCTS
Harold B. Kaufman, Jr., New York, N.Y., assignor to DCA Food Industries Inc., New York, N.Y., a corporation of New York
Filed Sept. 26, 1967, Ser. No. 670,695
Int. Cl. A21c *15/00;* F24f *13/06;* F26b *13/00*
U.S. Cl. 98—33                                          5 Claims

ABSTRACT OF THE DISCLOSURE

A bakery product cooler includes an endless helical band conveyor having vertically spaced convolutions delineating an axial space. A blower has its suction end connected to the conveyor axial space and its pressure end connected to the room housing the conveyor by means of a duct system provided with adjustable opening ports to permit to full exhaust, complete recirculation or partial recirculation of the air drawn by the blower from the axial space and the controlled mixing of this air with external air. The conveyor may be divided by a baffle into upper and lower sections and conditioned air blown into the axial space of one section flows radially outwardly, mixes with the ambient air and flows radially inwardly at the other section into the axial space from which it is withdrawn.

Background of the invention

The present invention relates generally to improvements in cooling apparatus and its relates particularly to an improved apparatus for the air cooling of continuously advanced freshly baked or fried products.

In the production of bakery products as typified by fried cakes such as doughnuts and the like, the palatability, appearance, storage stability and packaging characteristics of the product are generally affected by the manner in which the freshly baked product is cooled attendant to the packaging and distribution thereof. It has been found that optimum results are achieved when the freshly baked product is exposed to slowly moving air at a temperature below that of the exposed product, since, for among other reasons, there is no excessive moisture loss which is usually experienced when high velocity air is employed. This excessive moisture loss adversely affects the overall quality of the baked product. However, when the baked product is cooled by slowly moving air a long storage time is required, and in commercial production of a continuous nature, correspondingly large and awkward equipment is necessitated which occupies large amounts of space and is generally highly inconvenient.

Summary of the invention

It is a principal object of the present invention to provide an improved cooling apparatus.

Another object of the present invention is to provide an improved apparatus for the cooling of freshly cooked products.

Still another object of the present invention is to provide a bakery product cooling apparatus of highly compact construction and relatively high capacity and in which the bakery product is subject to a cooling procedure compatible with the production of an end product of high quality and suitable for packaging.

A further object of the present invention is to provide a compact self contained apparatus for the rapid cooling of freshly baked or fried products to a low temperature suitable for the packaging thereof while minimizing the temperature build up in the surrounding area.

Still a further object of the present invention is to provide a cooling apparatus of the above nature characterized by its great versatility and adaptability, its reliability, and its applicability to a large variety of baked products.

The above and other objects of the present invention will become apparent from a reading of the following description taken in conjunction with the accompanying drawings.

In a sense, the present invention contemplates the provision of a baking product cooling apparatus comprising an endless conveyor traversing a helical path from a trailing to a leading section and including a plurality of successive vertically axially spaced convolutions delineating an axial space, means for depositing articles on said conveyor trailing section, means for discharging said articles from said conveyor leading section, means defining a confined space surrounding said conveyor, closure means baffling the ends of said conveyor axial space from said confined space, a blower having an inlet and an outlet, means connecting said inlet to said axial space, and means connecting said outlet to the atmosphere. Another feature of the present invention resides in the provision of an arrangement in which the cooling air is caused to flow in opposite direction at different levels of the conveyor, advantageously by dividing the conveyor and axial space into two sections, blowing cooled air into the axial space at one section, and as it emerges, permitting it to admix with the ambient air which is sucked inwardly at the other conveyor section into the axial space from which it is exhausted. In a preferred form of the present apparatus, the conveyor axial space communicates by way of a first conduit with the suction part of a blower the pressure part of which is connected by a second conduit to the space surrounding the conveyor. The first and second conduits are provided with adjustable openings communicating with the exterior atmosphere to permit the control of the air circulation and mixing. The improved cooling apparatus is highly compact and of relatively large capacity. It is highly efficient and can cool the conveyed product in an optimum manner under a wide range of ambient conditions. Even products of a highly fragile nature may be processed since they are conveyed through the cooling apparatus with a minimum of disturbance. Moreover, the apparatus can effect a superior cooling of a great variety of products since, in spite of the fact of its compactness, it can expose the product to a cooling air whose temperature and velocity can be closely controlled, for an extended period of time compactable with a uniformly cooled end product of high quality and in an optimum packaging state. The apparatus is easily and readily adaptable to a wide range of cooling parameters.

Brief description of the drawings

FIGURE 1 is a diagrammatic front perspective view of a spiral conveyor employed in the present apparatus;

FIGURE 2 is a diagrammatic medial vertical sectional view of a preferred embodiment of the present apparatus;

FIGURE 3 is a front perspective view of the baffle system thereof;

Description of the preferred embodiments

Figure 4:
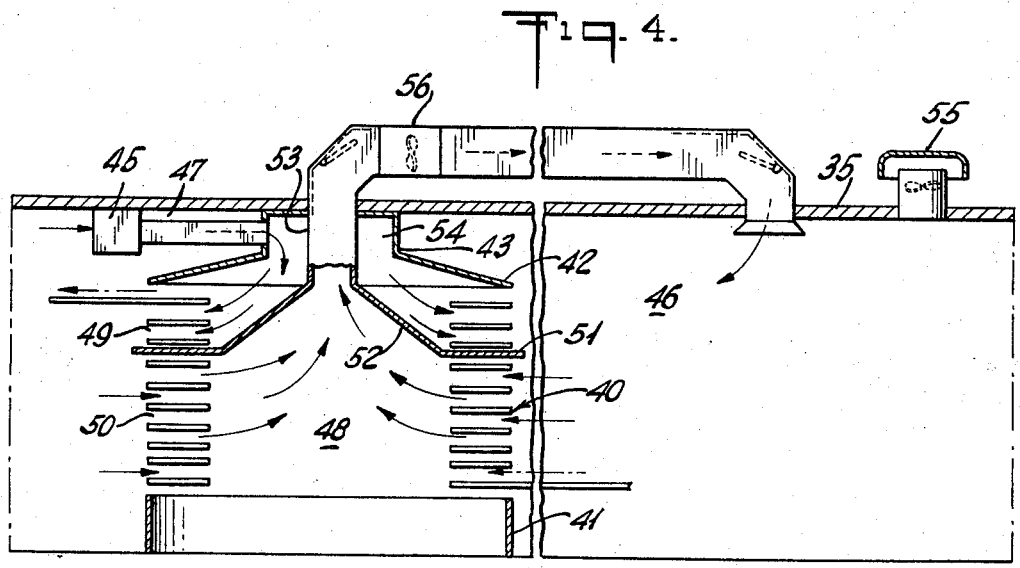
FIGURE 4 is a diagrammatic medial vertical sectional view of another embodiment of the present invention.

Referring now to the drawings and particularly FIGURES 1 to 3 thereof which illustrate a preferred embodiment of the present invention, the reference numeral 10 generally designates the improved cooling apparatus which is located in any convenient enclosed room or other confined space 11 which is easily accessible to the exterior atmosphere, advantageously through the roof 12 defining the top wall of the space 11. The space 11 could be suitably separated and insulated from the baking area to minimize the heating of the ambient air in the space 11 except as attendant to the cooling effected by the apparatus 10 or the baking or frying equipment may be in the vicinity of the apparatus 10 particularly if the former is suitably vented to the outside.

The apparatus 10 comprises an endless spiral conveyor 13 of known construction which includes an open framework mounted above the floor by a plurality of vertical legs 14. The framework supports a helical track and chain guide and an endless conveyor belt 16 formed of successive independently movable open grid members engaged by the chain and movable along the helical track in successive vertically spaced convolutions. The conveyor belt 16 advances from a top trailing section 18 helically downwardly to a bottom leading section 19 and thence along an undulating horizontal return run 20 through a belt washing trough 15 and upwardly to the trailing section 18. The belt 16 is driven and guided in the conventional manner, it being noted that it may be advanced from the bottom to the top of its helical path as well as from the top to the bottom thereof, as illustrated.

The conveyor belt 16 along its helical path surrounds a free axial space 22 which is open at its top and bottom, the space between successive convolutions of the belt 16 being open to provide free radial access from the outside of the spiral conveyor 16 along its full periphery to the axial space 22 through the space between successive convolutions of the belt 16. An endless feed conveyor 23 has an upper run advancing upwardly to the conveyor trailing section 18 to deliver the product to be cooled onto the conveyor belt 16 from the desired apparatus, for example, a continuous fryer, oven, glazer or the like. Another endless conveyor 24 has a trailing end suitably positioned at the leading section 19 of the conveyor belt 16 to receive the cooled product discharged therefrom to deliver it to further processing, such as glazing, or the like, and packaging.

In order to restrict the flow of cooled air to a path across the belt 16 between successive convolutions thereof in its helical path there is provided a cylindrical wall or baffle 21 which depends from the outer periphery of the bottom convolutions of the belt 16 to the floor 25 upon which the spiral conveyor 13 rests. A conical hood 26 coaxial with the spiral conveyor 13 is suitably supported directly above the conveyor 11 with its outer edge being spaced shortly above and in vertical alignment with the outer periphery of the top convolution of the belt 16.

A high speed blower 27 of known construction is mounted atop the roof 12 and has its suction inlet connected by a duct or conduit 28 extending horizontally from the blower 27 and then through an elbow to a vertical section projecting through aligned openings in the roof 12 and the apex of the hood 26 into communication with the conveyor axial space 22. The outlet or pressure side of the blower 27 is connected to a horizontal duct 29 which is connected by an elbow 30 to a vertical duct section which projects through an opening in the roof 12 to a point in the room 11 remote from the spiral conveyor 13. The conduit 28 is provided with an inlet port 32 the opening of which is adjustable by means of a hinged plate or damper 33 which registers with the port 32 and is inwardly swingably adjustable about a trailing axis in any suitable manner, preferably from within the room 11, whereby to control the fractions of air sucked by the blower 27 from the conveyor axial space 22 and the exterior atmosphere. Similarly, a port 34 is provided in the duct 30 and has an opening which is adjusted by means of a hinged plate or damper 36 which registers with the port 34 and is hingedly swingably adjustable about a leading axis in any suitable manner, likewise preferably from within the room 11, whereby to control the fractions of air from the blower 27 which is discharged into the external atmosphere and which is introduced into the room 11. The roof 12 is provided with a motor-driven propeller type roof ventilator 37, which is selectively actuated to blow exterior air into the room 11 and is protected from the elements by an overhanging hood member 38.

In the operation of the improved apparatus 10 in the cooling of fried cakes such as doughnuts or the like, the dampers 33 and 36 are adjusted, and the ventilator 37 selectively actuated in accordance with the atmospheric temperature in order to achieve an optimum temperature of air circulated through the cooling apparatus 10. The warm freshly fried cakes are delivered by the conveyor 23 and fed to the upper conveyor section 18, transported about a helical path and discharged at the leading section 19 onto the conveyor 24 which transports the cooled doughnuts to the next station. The conveyor belt 16 is transported through the trough 15 where it is cleaned and from which it returns to the top conveyor trailing section 18.

The blower 27, which is advantageously a high velocity blower, exhausts the air from the conveyor axial space 22 to reduce the pressure therein, and by reason of which cooling air is sucked from the space surrounding the conveyor 13 which air passes radially into the interior space 22 flowing across the conveyor belt 16 through the space between successive convolutions whereby to expose the cakes carried thereby to the cooling air flow. The cooling air to which the cakes C are exposed flows at a relatively low linear velocity as compared to that of the blower 27 by reason of the high cross-sectional area of the radial flow through the conveyor system into the interior space 22 as compared to the cross-section of the blower suction input. Accordingly, a high rate of cooling is achieved with a relatively low air velocity across the product, a highly desirable condition.

The dampers 33 and 36 are adjusted and the ventilator 37 energized in accordance with the exterior temperature. Thus, under cool weather conditions the ventilator 37 need not be energized and the dampers 33 and 36 are partially opened an amount to provide a desired ambient air temperature at the conveyor position. The open damper 33 permits the sucking of a predetermined amount of exterior air which is continuously admixed with the circulating cooling air, a fraction of which is exhausted through the opening adjusted port 34. The openings of the ports 32 and 34 are reduced with decreased atomspheric temperature. When the exterior air temperature is very high as during the summer months, the port 32 is closed and the port 34 is open to completely discharge the air exhausted from the conveyor axial space 22 and the ventilator 37 is energized to continuously introduce unheated fresh air into the room 11 to replace the air sucked therefrom by the blower 27 through the conveyor 13.

Figure 5:
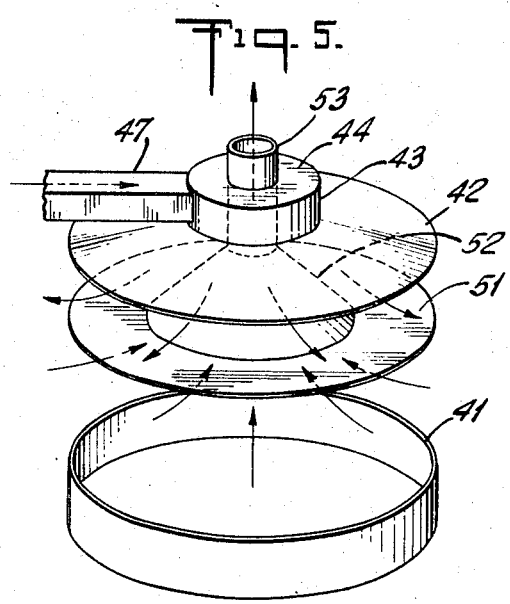
FIGURE 5 is a front perspective view of the baffle system thereof.

Under many conditions it is frequently desirable to cool a baked prduct to a temperature below that which may be readily obtained by the use of air at the ambient atmospheric temperature and at the desired rate. In FIGURES 4 and 5 of the drawing there is illustrated an apparatus embodying the present invention which can be employed to cool a baking product under the above conditions. The latter apparatus employs a spiral conveyor of the same structure and similarly located as the conveyor 13 previously described and provided with a bottom cylindrical wall 41 corresponding to the wall 21.

A conical hood 42 is coaxially supported directly above the spiral conveyor 40 and its outer peripheral edge is shortly above and outwardly of the peripheral outer edge of the top convolution of the spiral conveyor 40. A central opening is formed at the apex of the hood 42 and a cylindrical wall 43 projects upwardly from the edge of the opening to an annular top wall 44 abutting the ceiling 35 of the room 46 which houses the conveyor 40. The space delineated by the wall 43 communicates through an opening in the wall 43 and a duct 47 to a suitable source 45 of cooled and conditioned air which advantageously includes a blower for blowing air through the duct 43 and a temperature controlled air cooling system.

The spiral conveyor 40 and the axial interior space 48 delineated thereby are divided into upper and lower cooling sections 49 and 50 respectively by a baffle assembly 51. The baffle assembly 51 includes a flat partition strip 51, slightly greater in width than that of the conveyor belt and extending for approximately one convolution directly below a selected convolution of the conveyor belt of the spiral conveyor 40 between the top and bottom convolutions thereof. The inner periphery of the partition strip 51 is joined to an upwardly directed axial conical hood 52 located below the conical hood 42 and having a central opening the edge of which is joined by a vertical duct 53 projecting through an opening in the roof 35. The duct 53 is of smaller diameter than the cylindrical wall 43 and delineates therewith an annular plenum chamber 54. The upper end of the duct 53 communicates with the inlet suction port of a motor driven blower 56. It should be noted that a powered ventilator 55 is provided as in the earlier described embodiment and there is also advantageously provided the cooling air recirculating duct system having adjustable inlet and outlet ports as earlier set forth.

In the operation of the cooling apparatus last described, the warm freshly cooked products are conveyed in the manner earlier described and as they are transported along the upper leading cooling section 49 they are cooled by the air which is cooled and blown by the unit 45 through the duct 47 and annular chamber 54 into the axial space 48 above the hood 52 from which it flows radially outwardly across the products carried by the conveyor belt 40 between the partition 51 and the top of the spiral conveyor 40. The warm freshly cooked products are transported by the conveyor 40 through the lower section 50 where the cooked product is precooled by exposure to a mixture of the air flowing outwardly from the upper section 49 and the ambient air in the room 46, the air mixture flowing radially inwardly into the lower part of the axial space 48 from which it is sucked through the duct 53 by the blower 56 and exhausted into the atmosphere or partially or wholly recirculated. It should be noted that the inlet to the blower and cooling unit 45 is advantageously provided with a valved duct for introducing air from the external atmosphere in controlled amounts in any well known manner so that when the exterior temperature is sufficiently low the unit 45 may be operated solely as a blower and not energized to cool the air passing therethrough, or the air may completely bypass the cooling section of the unit 45.

While there have been described and illustrated preferred embodiments of the present invention, it is apparent that numerous alterations, omissions and additions may be made without departing from the spirit thereof. For example, the product may, if desired, be fed to the top of the conveyor 40 which is driven to advance from the top to the bottom. In the latter arrangement the baffle and air circulating system is modified so that the conditioned air is introduced into the lower section of the conveyor and flows outwardly and sucked with the ambient air to flow inwardly along the upper section of the conveyor.

I claim:
1. A baking product cooling apparatus comprising an endless conveyor traversing a helical path from a trailing to a leading portion and including a plurality of successive vertically axially spaced convolutions delineating an axial space, means for depositing articles on said conveyor trailing portion, means for discharging said articles from said conveyor leading portion, means for defining a confined space surrounding said conveyor, closure means baffling the ends of said conveyor axial space from said confined space, a blower having a suction inlet port and a pressure outlet port, means including a first conduit connected between a first of said blower ports and said confined space and having a first opening communicating with a space delineated from said confined and axial spaces, means for adjusting the flow of air through said first opening, means including a second conduit connected between the second of said blower ports and said axial space and having a second opening communicating with a space delineated from said confined and axial spaces, and means for adjusting the flow of air through said second opening.

2. The apparatus of claim 1 including partition means separating said conveyor helical path and said axial space into upper and lower sections one of said axial space sections being connected to one of said conduits, and means for directing a flow of air through said second section.

3. The apparatus of claim 2 wherein the outer peripheries of said helical path at said upper and lower sections are in gaseous communication.

4. The apparatus of claim 2 including means for cooling the air being directed through said second section.

5. The apparatus of claim 1 wherein said first and second conduits are connected to said blower pressure and suction ports respectively and said conduit openings communicate with the atmosphere, and including a motor driven ventilator providing communication between said confined space and the atmosphere.

References Cited

UNITED STATES PATENTS

| 3,269,142 | 8/1966 | De Mola et al. | 62—381 |
| 3,315,492 | 4/1967 | Dreksler | 62—381 |
| 3,348,659 | 10/1967 | Roinestad | 34—147 |
| 3,391,548 | 7/1968 | Gram | 62—381 |

LLOYD L. KING, Primary Examiner.

U.S. Cl. X.R.

34—147; 62—381